United States Patent [19]

Dekker

[11] 4,044,624

[45] Aug. 30, 1977

[54] BOAT STEERING WHEEL

[75] Inventor: Donald Allen Dekker, Grand Rapids, Mich.

[73] Assignee: Attwood Corporation, Lowell, Mich.

[21] Appl. No.: 625,895

[22] Filed: Oct. 28, 1975

[51] Int. Cl.² .............................................. B62D 1/04
[52] U.S. Cl. ....................................................... 74/552
[58] Field of Search ........................................ 74/552

[56] References Cited

U.S. PATENT DOCUMENTS

| 1,819,707 | 8/1931 | German ........................... 74/552 X |
| 1,943,915 | 1/1934 | Geyer ................................. 74/552 |
| 2,041,206 | 5/1936 | Pannecoucke ..................... 74/552 X |
| 2,623,405 | 12/1952 | Sampson ............................. 74/552 |
| 3,738,885 | 6/1973 | Lecomte ........................... 74/552 X |

Primary Examiner—Samuel Scott
Assistant Examiner—Randall Heald
Attorney, Agent, or Firm—Price, Heneveld, Huizenga & Cooper

[57] ABSTRACT

A steering wheel has a rim engaged by spokes radiating from a central hub. The central hub supports the spokes by means of radial openings having staked connecting points between the central hub and the spokes. Before staking, the spokes are movable within the radial openings so they can compensate for shrinkage of the rim during curing of the rim material or can engage of the steering rim to form the rim into a desired shape.

15 Claims, 5 Drawing Figures

U.S. Patent   Aug. 30, 1977   4,044,624
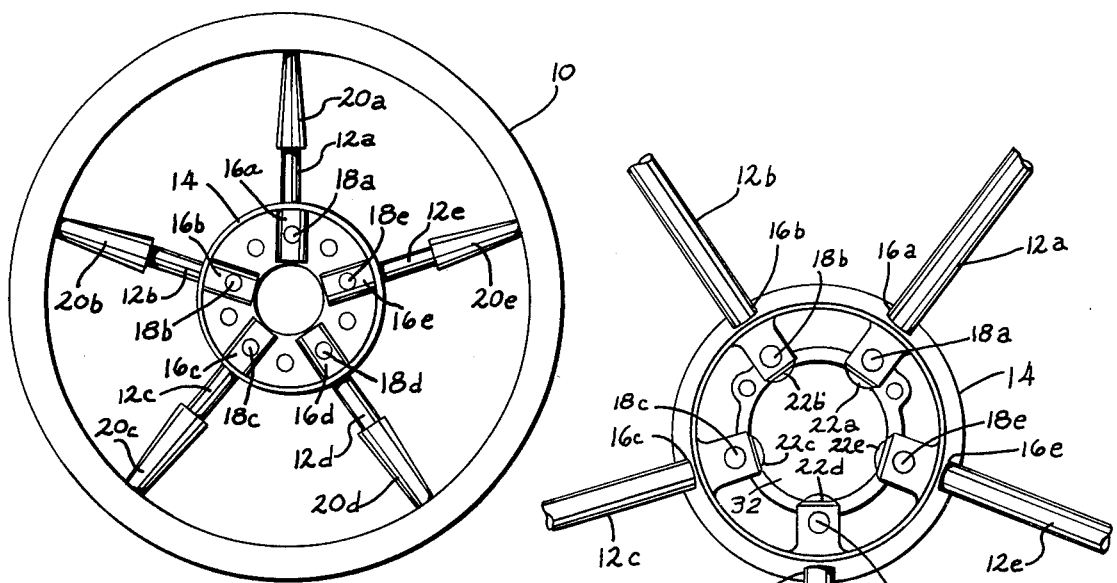
FIG. 1.
FIG. 3
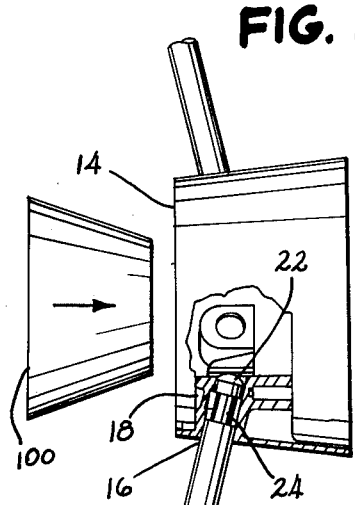
FIG. 4.
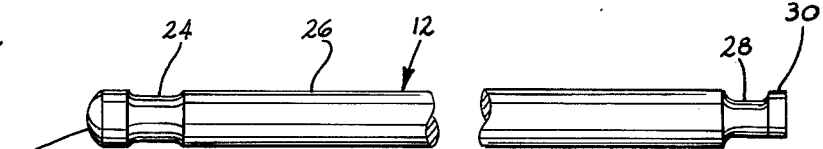
FIG. 2a.
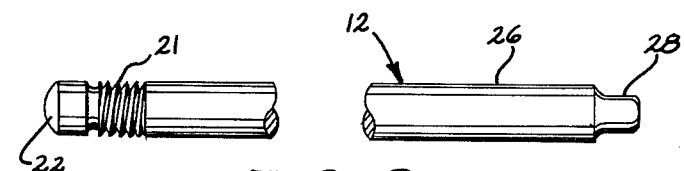
FIG. 2b.

BOAT STEERING WHEEL

BACKGROUND OF THE INVENTION

1. Field of the Invention

This invention relates to a steering wheel for a steering mechanism and a method for fabricating the wheel.

2. Description of the Prior Art

Steering wheels having a central hub, spokes and a rim are known in the prior art. In particular, it is known to mold plastic rims around circular metal inserts inside the rims. In preparation for molding, the metal rim insert is placed around the ends of the spokes which are affixed to a central hub. A plastic rim is then formed about the metal rim insert and the ends of the spokes. Although the cost of using a metal rim insert is significant, it has been found that the insert is necessary to maintain the shape of the rim because of shrinkage in the plastic when it cures. If there were no metal rim insert, the shrinkage of the plastic would tend to create a rim with distorted arcs between the ends of the spokes making the rim have the shape of a distorted circle. The use of the metal rim insert maintains the desired circular shape for the rim. Additionally, the use of the metal rim insert guards against the possibility of the plastic rim shrinking to such an extent that the ends of the spokes extend through the rim and are exposed. Using a metal rim insert to maintain the shape of the plastic rim builds stresses into the plastic as it cools. That is, the plastic is not permitted to shrink into a relaxed natural state. Introducing such stresses into a steering rim reduces the strength of the rim and makes it less resilient to impact. Typically, attempts to reduce the magnitude of such shrinkage of the steering rim include using relatively expensive materials that do not shrink very much. For example, ABS plastic is a common material.

The prior art also teaches one piece metal steering wheels including an integral hub, spokes and rim. However, fabrication of such integral pieces is typically difficult. Not only is substantial cost involved, but the configuration of the steering wheel is limited by the complexity of the mold which can be used. Fabrication of complicated shapes can lead to defects in the finished product which are difficult to correct because of their integral structure.

SUMMARY OF THE INVENTION

A steering wheel apparatus and method of fabrication in accordance with an embodiment of this invention permits the elimination of a metal rim insert and allows the use of plastics which may shrink more during curing but which costs less and have reduced weight. Elimination of a metal rim insert also reduces cost because of a material saving and the omission of part of the fabrication process. The plastic rim in accordance with an embodiment of this invention is permitted to shrink thereby eliminating the creation of stresses within the plastic rim and improving the strength and resistance to impact of the rim. This invention teaches permitting the spokes of the steering wheel to move as shrinkage occurs in the plastic rim during the curing process. Final securing of the spokes to a central hub is done after the curing process.

The steering wheel apparatus and method of fabrication thereof in accordance with an embodiment of this invention also simplifies fabrication of a steering wheel having a metal rim and metal spokes. A complex mold is not necessary because there can be molds for individual pieces of the steering wheel and adjustment of the individual pieces into a finished steering wheel to compensate for minor variations in the separate molded pieces. In addition to an improved finished product, the fabrication of the product is simplified. Separate fabrication of spokes, steering rim and central hub permit easy adaptation of the components of the steering wheel to be used as components of different steering wheels. For example, the material of the steering rim can be changed while maintaining the same spoke material and configuration. Additionally, having these spokes apart from the steering rim before assembly permits decorative features to be added to the spokes.

A steering wheel in accordance with an embodiment of this invention includes a steering rim engaged by radial spokes connected to a central hub. The connection of the spokes to the central hub is through radial openings which have staked indentations into the openings securing the spokes from movement within the opening. Before the central hub is staked to the spokes, a plastic rim is formed around the peripheral ends of the spokes and the spokes are allowed to move inward to permit the plastic rim to shrink. As a result, plastic materials which shrink more but have other desirable characteristics such as reduced cost or reduced weight can be used.

If a steering rim of a material such as metal is fabricated separately from the spokes, the spokes are positioned radially outward to engage the steering rim. Such individual adjustment of spokes can compensate for any minor defects in either the fabrication of the steering rim or the spokes. For example, if the rim is slightly out of round pressure can be applied by the spoke to the steering rim to permit the rim to be shaped into a circular form. Similarly, small variations in the length of the spoke can be compensated this way.

In accordance with the method of this invention, radial force is applied to the spokes by inserting a conical member into a central opening in the central hub. The application of a radial outward force on the steering rim by the spokes also is advantageous to prevent any deformation of the steering rim while in use. Thus, not only is the desired shape initially achieved but it is maintained by a steering wheel and fabrication in accordance with an embodiment of this invention. Separate fabrication of the metal spokes permits relatively thin spokes which is advantageous because there can be a relatively unobstructed view of any instruments located behind the wheel.

BRIEF DESCRIPTION OF THE DRAWINGS

FIG. 1 is a front elevation view of a steering wheel in accordance with an embodiment of this invention;

FIG. 2a is a side elevation view of a spoke segment in accordance with an embodiment of this invention;

FIG. 2b is a side elevation view of a segment of an alternative embodiment of an end of a spoke in accordance with an embodiment of this invention;

FIG. 3 is a front elevation view of a central hub and spoke segments in accordance with an embodiment of this invention; and FIG. 4 is a side elevation and partial cross section of a central hub and spoke segments in accordance with an embodiment of this invention.

DETAILED DESCRIPTION OF THE PREFERRED EMBODIMENT

Referring to the drawings, a generally circular steering wheel includes an annular steering rim 10 connected by elongated radial spokes 12a, 12b, 12c, 12d and 12e to a central hub 14 having radial openings 16a, 16b, 16c, 16d and 16e adapted to axially receive the spokes. Connecting spokes 12 to central hub 14 are stake points 18a, 18b, 18c, 18d and 18e aligned with radial openings 16a–16e, respectively. If desired, decorative sleeves 20a, 20b, 20c, 20d and 20e can be located on spokes 12.

FIG. 2a shows a side elevation view of a spoke 12 having a curved surface end hemisphere 22 at a first end of spoke 12, a circumferential groove 24 spaced axially from the first end, a main body 26 having an elongated cylindrical shape, a stud end 28 connected to main body 26 at the end opposite from groove 24 and having a generally cylindrical shape axially aligned with and having a smaller diameter than main body 26, and a stud head 30 connected to stud end 28 at a second end of spoke 12. The spoke shown in FIG. 2a is particularly adapted for use with a molded plastic rim. Stud head 30 is generally cylindrical but has a flat peripheral portion parallel to the axis of spoke 12 so that stud head 30 and spoke 12 do not easily turn when a molded rim encases stud head 30. Hemisphere 22 is rounded so when a wedge, such as a cone inserted into a central opening 32 of central hub 14, is used to apply a radial force to spoke 12 there is an easy sliding engagement between the cone and spoke 12. FIG. 2b shows a portion of a spoke 12, including the second end, particularly adapted for use with a metal rim having radial openings for insertion of stud end 28. A metal rim is fabricated separately from the spokes and the spokes are joined to the metal rim by inserting stud end 28 into generally cylindrical radially aligned openings in the inside periphery of the metal rim. That is, the embodiment of FIG. 2b does not have a stud end 30 to prevent rotation of spoke 12 or to prevent withdrawal of spoke 12 from rim 10.

FIG. 3 shows an assembly of central hub 14 and spokes 12. Central hub 14 is generally shaped as a conical frustum with an axial circular central opening 32. Radial openings 16 extend through central hub 14, open onto central opening 32, and have a generally cylindrical boundary of sufficient diameter to receive main body 26 of spoke 12. Stake points 18 are generally areas of softer metal in central hub 14 and extend generally parallel to the axis of central hub 14 to intersect radial opening 16. Central opening 32 in central hub 14 permits a conical wedge to be inserted and abut hemispheres 22 of each spoke thereby providing a radial outward force on each spoke toward the rim. Indentations are mechanically forced at stake points 18 toward radial openings 16 thereby engaging spokes 12 in openings 16 and securing spokes 12 against radial movement. Typically, the indentations at stake points 18 are aligned with grooves 24 and shoulders between grooves 24 and the rest of spokes 12.

FIG. 4 shows a side elevation view of an assembly of a central hub 14 and spoke 12 with a portion of central hub 14 broken away to reveal a partial cross section of central hub 14 showing the indentation of stake point 18 to conform with the shape of groove 24 thereby securing spoke 12. In a preferred embodiment, the spokes are not perpendicular to the axis of central hub 14 but slant forward toward the operator. Similarly, radial openings 16 slant forward. In accordance with an alternative embodiment of this invention spoke 12 can have a threaded region 21 near hemisphere 22 to engage a similarly threaded region in opening 16 of central hub 14. As a result, spoke 12 can be moved in and out of opening 16 by turning. Nevertheless, an indentation of stake point 18 can be used to secure spoke 12 within central hub 14.

Decorative sleeve 20 is shaped as a conical frustum having an axial cylindrical opening with sufficient diameter to receive main body 26 of spoke 12. If sleeve 20 is to abut steering rim 10 an end of sleeve 20 has a concave surface shaped to snugly fit against the convex surface of steering rim 10. Typically, sleeve 20 is secured to spoke 12 by a set screw extending radially through sleeve 20 and engaging spoke 12. The material of sleeve 20 can be plastic but can vary to achieve a particular desired effect.

A plastic material particularly advantageous for use with this invention as a rim is foamed polypropylene. A typical material for spokes 12 and central hub 14 is stainless steel which is advantageous both for strength and appearance. The material of hub 14 at indentation 18 should be a softer material such as nickel to permit deformation when staking takes place.

FABRICATION

In accordance with an embodiment of this invention, a steering wheel having a plastic rim is fabricated by forming central hub 14 and spokes 12. Typical fabrication techniques include molding or casting of hub 14 and spokes 12. Decorative sleeves 20 can be fabricated of a plastic material by processes such as molding and extrusion. Spokes 12 are inserted into radial openings 16 of central hub 14 and tacked into place by a slight deformation of central hub 14 at stake points 18. The purpose of this slight tacking is to facilitate handling of central hub 14 and spokes 12 as a unit. If desired, decorative sleeves 20 can be slipped on spokes 12.

Stud heads 30 of spokes 12 are placed into a mold for steering rim 10. The mold is filled with a material such as an Eastman structural foam. When the foam material is sufficiently solid, the mold is removed. During the hardening or curing process which now takes place, steering rim 10 has a tendency to shrink and move spokes 12 radially inward. The slight tacking of spokes 12 is not sufficient to prevent this radial movement. Since spokes 12 can move, no tension or stresses are formed within steering rim 10 as the steering rim shrinks. To more perfectly form the desired shape of rim 10, such as a true circle, a conical wedge 100, shown in FIG. 4, is inserted axially into central opening 32 of central hub 14. As the conical wedge is moved into opening 32 it engages hemispheres 22 of spokes 12 and applies a radial outward force to the spokes. Continuing to force the conical wedge into opening 32 generally aligns hemispheres 22 a uniform distance from the boundary of the opening 32 thereby extending all of spokes 12 about the same radial distance from central hub 14. Once spokes 12 are in this position a permanent tack is made at stake points 18.

In an alternative embodiment of this invention, rim 10 can be formed of a metal material such as stainless steel and have radial openings spaced to receive stud ends 28 of spokes 12. Since metal rim 10 is formed before spokes 12 are inserted, spokes 12 do not have a head 30 but have the configuration as shown in FIG. 2 with just a stud end 28. The alignment and positioning of spokes 12 can be done in a manner as described before with a conical wedge. Alternatively, spokes 12 can have threads around the circumference of the portion of spoke 12 which is inserted into a radial opening 16 also having threads to engage the threaded spoke. When there are threads, each spoke is individually turned so it moves outward until stud end 28 is within the radial openings of rim 10 and spoke 12 is applying outward pressure on rim 10. Accordingly, even in this embodiment spokes 12 can be adjusted so they tend to form a true circle of rim 10 if that was the desired shape and also apply an outward force to rim 10 preventing deformation of rim 10 when in use.

Various modifications and variations will no doubt occur to those skilled in the various arts to which this invention pertains. For example, the particular connection between the spokes and central hub may have a different configuration than that disclosed above. The specific physical configuration of the spokes may also vary. These and all other variations which basically rely on the teachings through which the disclosure has advanced the art are properly considered within the scope of this invention as defined by the appended claims.

The embodiments of the invention in which an exclusive property or privilege is claimed are defined as follows:

1. A steering wheel comprising:
    an annular steering rim;
    a central hub having a spoke receiving means and a central axial opening;
    a plurality of elongated radial spokes having a first end with rim coupling means and a second end with hub coupling means, each spoke coupled at the first end to the steering rim and at the second end to the spoke receiving means; and
    spoke securing means in the central hub, the spoke securing means being a relatively more easily deformed portion of the central hub for engaging the spoke within the spoke receiving means and including a staked projection from the central hub projecting into said spoke receiving means and engaging said hub coupling means of a radial spoke passing through said spoke receiving means thereby securing the radial position of the spoke.

2. A steering wheel comprising:
    an annular steering rim;
    a central hub having a spoke receiving means and a central axial opening;
    a plurality of elongated radial spokes having a first end with rim coupling means and a second end with hub coupling means, each spoke coupled at the first end to said steering rim and at the second end to said spoke receiving means;
    spoke securing means in the central hub, said spoke securing means being a relatively more easily deformed portion of said central hub for engaging said spoke within said spoke receiving means; and
    said spoke receiving means including a plurality of radial, circumferentially spaced openings in the central hub, extending through the central hub to the central opening.

3. A steering wheel as recited in claim 2 wherein the spoke securing means comprises:
    a staked projection from the central hub projecting into a radial opening, generally along a radius of the radial opening, and engaging the hub coupling means of a radial spoke passing through the radial opening thereby securing the radial position of the spoke.

4. A steering wheel as recited in claim 3 wherein the rim coupling means of the spoke includes a stud head for engaging the rim, the stud head having a greater radial cross section than the radial cross section of the spoke adjacent the stud head, and the hub coupling means of the spoke includes a circumferential depression for receiving the staked projection from the central hub thereby securing the spoke, the circumferential depression having a smaller radial cross section than the radial cross section of the spoke adjacent the circumferential depression.

5. A steering wheel as recited in claim 4 wherein the stud head of the rim coupling means of the spoke is noncircular for preventing rotation of the spoke.

6. A steering wheel as recited in claim 5 wherein the spokes have a generally cylindrical shape and the radial openings in the central hub are generally cylindrical of a diameter to receive and support the spokes.

7. A steering wheel as recited in claim 6 wherein the annular steering rim is of a molded plastic material.

8. A steering wheel as recited in claim 7 wherein the material is a foamed polypropylene.

9. A steering wheel comprising:
    a metal material annular steering rim;
    a central hub having a spoke receiving means and a central axial opening;
    a plurality of elongated radial spokes having a first end with rim coupling means and a second end with hub coupling means, each spoke coupled at the first end to said steering rim and at the second end to said spoke receiving means;
    spoke securing means in said central hub, said spoke securing means being a relatively more easily deformed portion of said central hub for engaging the spoke within said spoke receiving means;
    said rim coupling means of the spoke including an axial end projection having a smaller radial cross section than the cross section of the spoke adjacent the axial end projection; and
    said steering rim having axial indentations for receiving the axial projections of the spokes, the axial indentations extending partially through the steering wheel and opening toward the central axis of the steering wheel.

10. A steering wheel as recited in claim 9 wherein the hub coupling means of the spokes includes screw threads circumferentially surrounding the spoke.

11. A steering wheel as recited in claim 10 wherein the radial openings in the central hub have threads for receiving the screw threads of the spokes and radially positioning the spokes by screwing.

12. A steering wheel as recited in claim 11 wherein the spokes have a generally cylindrical shape and the openings are generally cylindrical of a size to receive and support the spokes.

13. A steering wheel as recited in claim 12 wherein the spoke securing means comprises:
    a staked projection from the central hub into a radial opening, generally along a radius of the radial opening, and engaging the hub coupling means of a radial spoke passing through the radial opening, the staked projection engaging and partially deforming the threads of the spokes.

14. A steering wheel as recited in claim 13 further comprising:
    an annular member positioned on a spoke between the rim and the central hub so the spoke passes through the central opening of the member.

15. A steering wheel comprising:

an annular steering rim of foamed polypropylene;

a central hub having a plurality of substantially cylindrical, circumferentially spaced, radial openings extending through the central hub and connecting to a central axial opening of the central hub;

a plurality of elongated generally cylindrical radial spokes having a first and a second end, each spoke coupling at the first end to the steering rim and at the second end passing through one of the plurality of radial openings, the first end including a non-circular head stud having a radial cross section larger than the radial cross section of an adjacent portion of the spoke and the second end including a circumferential groove having a radial cross section smaller than the radial cross section of an adjacent portion of the spoke; and a staked projection from the central hub into a radial opening and engaging the circumferential groove of the radial spoke passing through the opening thereby securing the radial position of the spoke, the staked projection being a relatively more easily deformed portion of the central hub.

* * * * *